United States Patent [19]
Miller et al.

[11] Patent Number: 6,099,606
[45] Date of Patent: *Aug. 8, 2000

[54] AIR FILTRATION ARRANGEMENTS HAVING SPACER CONSTRUCTIONS

[75] Inventors: Thomas G. Miller, Eagan, Minn.; Dolan D. Bartels, Delphi, Ind.; Andrew L. Albitz, Mulburry, Ind.; Bruce R. Crenshaw, Frankfort, Ind.

[73] Assignee: Donaldson Company, Inc., Minneapolis, Minn.

[ * ] Notice: This patent issued on a continued prosecution application filed under 37 CFR 1.53(d), and is subject to the twenty year patent term provisions of 35 U.S.C. 154(a)(2).

[21] Appl. No.: 09/044,709

[22] Filed: Mar. 19, 1998

[51] Int. Cl.$^7$ .................................................. B01D 46/24
[52] U.S. Cl. ............................ 55/330; 55/385.3; 55/482; 55/498; 55/502; 55/503; 55/504
[58] Field of Search .............................. 55/482, 498, 502, 55/503, 504, 492, 330, 385.3

[56] References Cited

U.S. PATENT DOCUMENTS

| | | | |
|---|---|---|---|
| 3,584,439 | 6/1971 | Gronholz | 55/498 |
| 3,616,618 | 11/1971 | Gronholz et al. | 55/498 |
| 3,672,130 | 6/1972 | Sullivan et al. | 55/330 |
| 4,006,000 | 2/1977 | Tortorici et al. | 55/503 |
| 4,020,783 | 5/1977 | Anderson et al. | 55/502 |
| 4,135,899 | 1/1979 | Gauer | 55/482 |
| 4,261,710 | 4/1981 | Sullivan | 55/482 |
| 4,278,455 | 7/1981 | Nardi | 55/482 |
| 4,482,368 | 11/1984 | Roberts | 55/503 |
| 4,595,401 | 6/1986 | Witchell | 55/385.3 |
| 4,950,317 | 8/1990 | Dottermans | 55/498 |
| 5,112,372 | 5/1992 | Boekermann et al. | 55/492 |
| 5,120,337 | 6/1992 | Benzler et al. | 55/482 |
| 5,484,466 | 1/1996 | Brown et al. | 55/498 |
| 5,730,769 | 3/1998 | Dungs et al. | 55/385.3 |
| 5,755,842 | 5/1998 | Patel et al. | 55/385.3 |
| 5,800,581 | 9/1998 | Gielink et al. | 55/385.3 |

FOREIGN PATENT DOCUMENTS

WO 94/13389  6/1994  WIPO .
WO 99/00174  1/1999  WIPO .

OTHER PUBLICATIONS

Declaration of Thomas G. Miller (with attached Exhibits A and B).

*Primary Examiner*—Duane S. Smith
*Attorney, Agent, or Firm*—Merchant & Gould P.C.

[57] ABSTRACT

An air filter element includes structure for supporting a secondary air filter element mounted within it, such as a safety element. In certain arrangements, the air filter element includes a media pack having first and second ends and defining an open filter interior. A first open end cap is positioned on the media pack first end. A second closed end cap is positioned on the media pack second end. The spacer construction has attachment structure and positioning structure. The attachment structure secures the spacer arrangement within the open filter interior, and the positioning structure extends from the attachment structure. In one illustrated embodiment, the spacer construction includes an insert embedded within the second closed end cap. In one illustration, the insert has a circular disk with feet and a centrally extending post with a fin arrangement.

17 Claims, 6 Drawing Sheets

6,099,606

AIR FILTRATION ARRANGEMENTS HAVING SPACER CONSTRUCTIONS

FIELD OF THE INVENTION

The present invention relates to filter arrangements and methods. More specifically, it concerns arrangements for filtering particulate material from gas flow streams, for example, air streams using primary and safety elements.

The assignee of this invention is Donaldson Company, Minneapolis, Minn. The assignee also owns the following applications: Ser. No. 08/884,205 filed on Jun. 27, 1997; and Ser. No. 09/025,828 filed on Feb. 19, 1998. Ser. No. 08/884,205 was a continuation-in-part of Ser. No. 08/742,244 filed Oct. 31, 1996 now U.S. Pat. No. 5,690,712. Ser. No. 08/742,244 was a divisional of Ser. No. 08/344,371 filed Nov. 23, 1994, now U.S. Pat. No. 5,613,992. The complete disclosures of Ser. Nos. 08/884,205; 09/025,828; 08/742,244; 08/344,371; and U.S. Pat. No. 5,613,992 are incorporated herein by reference.

BACKGROUND OF THE INVENTION

Gas streams often carry particulate material therein. In many instances, it is desirable to remove some or all of the particulate material from a gas flow stream. For example, air intake streams to engines for motorized vehicles or power generation equipment, gas streams directed to gas turbines, and air streams to various combustion furnaces, often include particulate material therein. The particulate material, should it reach the internal workings of the various mechanisms involved, can cause substantial damage thereto. It is therefore preferred, for such systems, to remove the particulate material from the gas flow upstream of the engine, turbine, furnace or other equipment involved.

In other instances, production gases or off gases from industrial processes may contain particulate material therein, for example, those generated by the process. Before such gases can be, or should be, directed through various downstream equipment and/or to the atmosphere, it may be desirable to obtain substantial removal of particulate material from those streams.

A variety of air filter or gas filter arrangements have been developed for particulate removal. In general, however, continued improvements are sought.

SUMMARY OF THE INVENTION

The disclosure herein describes an air filter element having structure for maintaining spacing from, and in some instances supporting, a secondary air filter element mounted within it, such as a safety element. In certain arrangements described herein, the air filter element includes a media pack having first and second ends and defining an open filter interior. A first open end cap is positioned on the media pack first end. A second closed end cap is positioned on the media pack second end. The spacer construction has attachment structure and positioning structure. During assembly, the attachment structure secures the spacer arrangement within the open filter interior by a press fit inside of an inner liner in the media pack, and the positioning structure extends from the attachment structure.

In certain preferred arrangements, during manufacture the spacer arrangement is secured to the second end cap. Preferably, the second end cap comprises a compressible polymeric material, and the attachment structure is at least partially embedded within the polymeric material of the second end cap.

In certain preferred embodiments, the attachment structure includes a disk having a circular outer periphery with a plurality of spaced legs extending outwardly therefrom. Preferably, the positioning structure includes a central post and fin members radially extending from the post (and extending or projecting axially from the disk).

Certain preferred arrangements described herein include an air cleaner arrangement having a housing with an airflow tube (typically an outlet) and a safety element. Preferably, a primary cylindrical element is oriented within the housing. A spacer construction is preferably oriented within the interior of the primary element, and is constructed and arranged to help maintain the safety element in air flow communication with the air flow tube.

Methods for filtering, using, and installing or changing out filter elements are described herein. Such methods preferably employ constructions as described herein.

DETAILED DESCRIPTION

Figure 1:
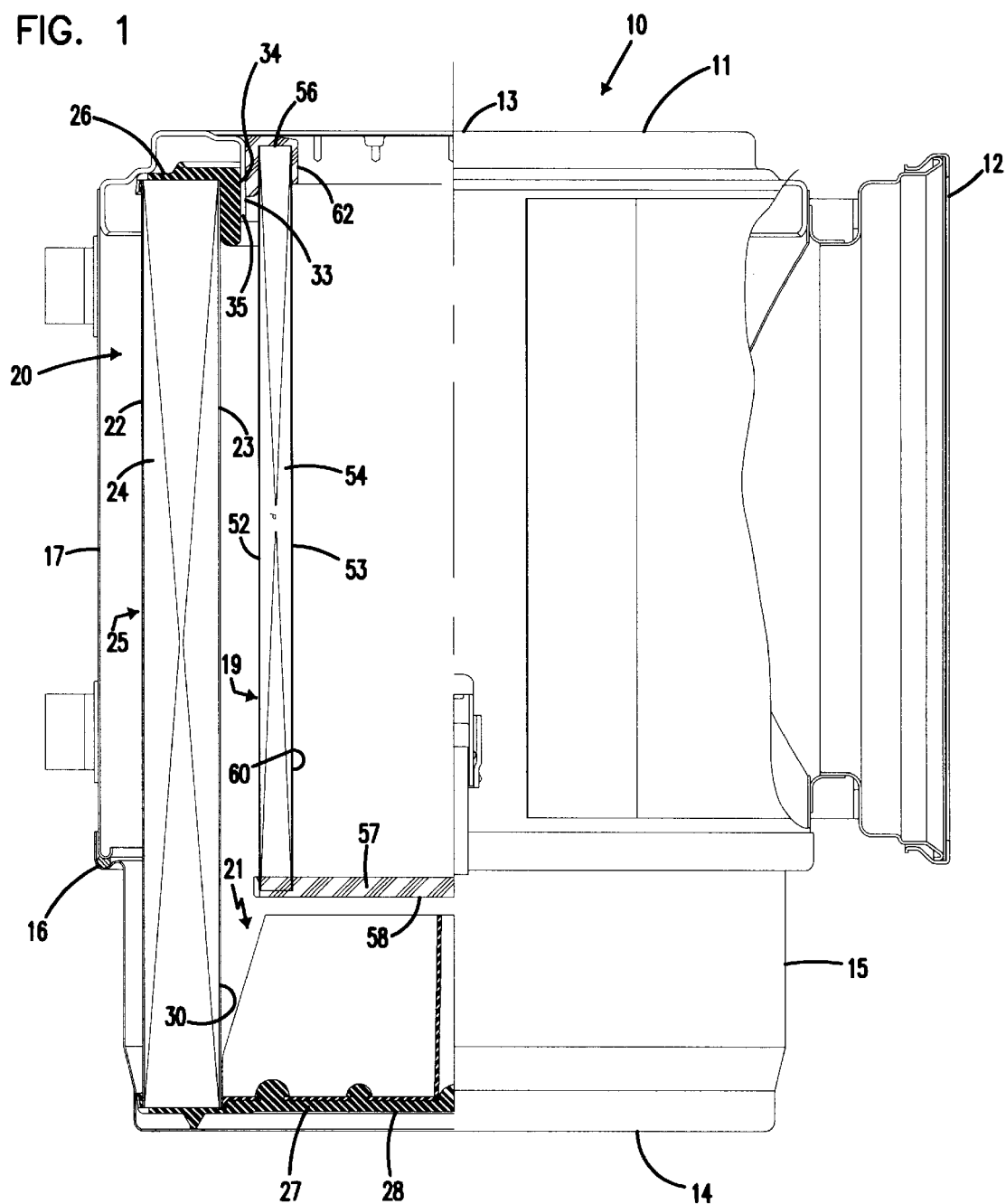
FIG. 1 is a partial cross-sectional view of an embodiment of an air cleaner, including a spacer construction, in accordance with certain applications of the present invention.

A. General Characterizations of Air Cleaners and Systems

Herein, the term "air cleaner" will be used in reference to a system which functions to remove particulate material from an air flow stream. The term "air filter" references a system in which removal is conducted by passage of the air, carrying particulate therein, through filter media. The term "filter media" or "media" refers to a material or collection of material through which the air passes, with a concomitant deposition of the particles in or on the media.

Herein the term "filter element" is generally meant to refer to a portion of the air cleaner which includes the filter media therein. In general, a filter element will be designed as a removable and replaceable, i.e. serviceable, portion of the air cleaner. That is, the filter media will be carried by the filter element and be separable from the remainder portion of the air cleaner so that periodically the air cleaner can be rejuvenated by removing a loaded or partially loaded filter element and replacing it with a new, or cleaned, filter element. Preferably, the air cleaner is designed so that the removal and replacement can be conducted by hand. By the term "loaded" or variants thereof in this context, reference is meant to an air cleaner which has been on-line a sufficient period of time to contain a significant amount of trapped particles or particulates thereon, for example, at least a weight gain of 5%. In many instances, during normal operation, a filter element will increase in weight, due to particulate loading therein, of two or three times (or more) its original weight.

Herein, in some instances references will be made to "on-road" and "offroad" elements. In general, a typical difference between on-road and off-road element design and use concerns the presence of a "safety element" although safety elements can, of course, be used in "on-road" circumstances. More specifically, in many instances, off-road filter elements are utilized in association with the safety elements. For forward flow arrangements, the safety element is generally a cylindrical element that is positioned inside of the "primary" element during use. The term "primary", in this and similar contexts, is meant to refer to the element which conducts the majority of particle collection, in normal use. Typically, it will be the more "upstream" element, if a safety element is involved. Herein, when the term "element" is used, reference is meant to the primary element, if a safety element is involved. Reference to safety elements will generally be specific by the use of the term "safety". In general, a secondary filter or safety filter is typically an element secured in place on a downstream side of the primary filter element. In arrangements using Donaldson radially sealing arrangements on the primary filter element, the secondary filter or safety filter is generally positioned with an end secured to the inside of the outlet tube, and a remainder as the safety element positioned in longitudinal extension along the open internal volume of the primary filter.

In the filter art, elements are often referenced with respect to whether they are constructed for "light duty", "medium duty" or "heavy duty" application. With respect to on-road, the specification generally relates to the minimum expected lifetime for the element, in terms of miles of operation of the vehicle involved. Typical light duty applications or elements are constructed and arranged to operate effectively for at least 20,000 miles, typically at least 30,000 miles. Medium duty elements are generally ones constructed and arranged to operate for an average of at least 40,000 miles, typically at least 50,000 miles. Heavy duty elements are elements constructed and arranged to operate for at least about 90,000 miles, typically 100,000 miles or longer. Of course, the characterization is on a continuum. An element designed for 80,000 miles, for example, might be classified by some as a heavy duty element.

Off-road elements are also generally characterized as light duty, medium duty or heavy duty elements. For off-road specifications, however, the definitions are generally with respect to expected hours of use, prior to filter element change. In general, light duty elements, for off-road use, are elements constructed and arranged for an expected operation period of at least about 90 hours and typically at least 100 hours without change out; medium duty elements are generally constructed and arranged for operation in the field for at least about 225 hours, typically at least 250 hours, without change out; and, heavy duty elements are generally elements constructed and arranged to be used in the field for at least about 450 hours, typically at least 500 hours, without change out. Again, a continuum is involved.

With many vehicle engine air filters, a preference has been developed for cylindrical air filter elements. Reasons for this vary including: use of established filter element manufacturing techniques; convenient housing design; familiarity with respect to servicing; ease of servicing; robustness, etc. With such cylindrical arrangements, in general, two flow patterns have been developed: a forward flow arrangement in which the flow, during filtering, is from an exterior of the cylindrical media through the media to an open interior; and, a reverse flow system in which air flow during filtering is from an open interior of the cylindrical construction, through the media, to a region exterior.

For purposes of the present description of an example, a construction in which a forward flow arrangement is involved, will be assumed. With a forward flow arrangement involving a cylindrical air filter, the open interior of the air filter is provided in air flow communication with an air flow duct (outlet duct), to the engine. The outlet duct operates as a clean air duct directing airflow from the clean air side of the media, i.e., the interior of the cylindrical air filter, through to the engine air intake manifold. Forward flow arrangements, using a radially sealing construction for the filter element, are described and shown, for example, in U.S. Pat. No. 5,423,892, especially with respect to the description concerning FIG. 2.

B. Some Problems with Utilizing Safety Elements

In systems utilizing safety elements, certain problems are sometimes encountered. As described above, safety elements are often mounted to the air flow outlet tube with the primary element mounted around and over it. In certain arrangements, the safety element extends the complete length of the primary filter interior. In those systems, servicing of the air cleaner can be difficult. In particular, when removing the primary element from the air outlet tube, the primary element must be moved over the entire length of the safety element. In tight or confined spaces, this removal can cause difficulties, because there may not be space to move the primary element over that entire distance. At least in part, as a result, in certain arrangements, the safety element has been made shorter. That is, the safety element has been made to not extend the entire axial length of the interior of the primary element. The shorter safety element allows for easier servicing of the air cleaner in confined spaces. This is because the primary element does not have to be moved as far axially before being angled when changing the element out. Using a shorter element has, however, lead to other difficulties.

As the equipment utilizing the air cleaner is operated, significant vibration may occur. This is especially true for vehicles with engines operated in offroad conditions over rough terrain. The vibration of the air flow outlet tube can sometimes disengage the shorter safety elements from the air flow outlet tube. This causes the shorter safety elements to drop inside of the primary elements and rattle around, which is undesirable.

Other problems with safety elements concern activities when servicing the air cleaner. When either initially installing the safety element and primary element, or when changing out the safety and primary elements, the person servicing the air cleaner sometimes improperly uses the primary element to seat the safety element. That is, if the safety element is mounted only partially on the air flow outlet tube, and the primary element is placed over it, the closed end cap of the primary element will abut the closed end cap of the safety element. The person servicing the air cleaner will push the primary element onto the outlet tube, and the closed end cap of the primary element pushes against the closed end cap of the safety element. This can cause damage to the primary element by puncturing or weakening the closed end cap of the primary element.

The arrangements described herein help to reduce problems associated with safety elements, such as those described above, and others.

C. The Arrangements of FIGS. 1–7

An example of an improved air cleaner with a primary filter element and a safety element according to the present invention is illustrated in FIG. 1, in partial cross-section. In FIG. 1, an air cleaner is shown generally at 10. Air cleaner 10 includes a housing 11 with an air flow inlet 12 and air flow outlet 13. At an end opposite of the air flow outlet 13 is a closed end 14 of the housing. The housing 11 is generally constructed and arranged to be openable and closeable to allow for servicing of the elements inside. Housing 11 includes a removable cover 15 to permit access to the internal filter elements. An O-ring sealing member 16 may be used to form a seal between the housing cover 15 and the housing body 17, if desired.

Oriented within housing 11 is a primary filter element 20 having an insert or spacer construction 21. Also oriented within housing 11 is a safety element 19.

In general, air cleaner 10 operates as follows: An air flow stream passes through inlet 12, through the media of the primary element 20, through the media of the safety element 19, and passes out through the air flow outlet 13. During passage through the filter media, the air is cleaned of certain particulates therein.

1. The Primary Filter Element 20

The preferred filter element 20 depicted generally includes an outer liner 22 and an inner liner 23. A media construction 24 is positioned between the outer liner 22 and inner liner 23. A variety of materials can be utilized for the outer and inner liners 22, 23 including expanded metal, perforated metal and plastic liners, as examples. In general, the outer and inner liners 22, 23 should preferably: (a) be selected of materials appropriately perforated or otherwise made porous so as not to substantially interfere with airflow through the arrangement; and (b) be of appropriate structural rigidity and strength to contain the media construction and provide the arrangement with sufficient axial strength for the use intended and to protect the media construction from damage. Typical liners have an open area of at least 50%, often 60% or more. Galvanized metal or plastic arrangements are typically preferred. Herein the combination of the outer liner 22, inner liner 23 and media construction 24 will sometimes be referred to as the media pack 25.

The preferred filter element 20, depicted in FIG. 1, includes first and second opposite end caps 26 and 27. In the arrangement shown, the media pack 25 is embedded in, and extends between, the end caps 26 and 27. The particular preferred arrangement shown utilizes end caps 26 and 27 formed from a soft, compressible elastomer with the liners 22, 23 and the media construction 24 embedded therein. In some applications of the techniques disclosed herein, harder material can be used as one or more of the end caps, with the media and liners secured to the end caps by potting material such as an adhesive, for example, a plastisol adhesive.

While a variety of materials can be utilized to form the end caps 26, 27, for typical arrangements, foamed polyurethane material is used. Such materials are more fully described below.

Still referring to FIG. 1, it is noted that end cap 27 is a "closed" end cap. That is, end cap 27 includes no airflow apertures therein, so, in general, air is prevented from flowing through end 28 from an exterior of the filter element 20 to interior volume 30.

Figure 2:
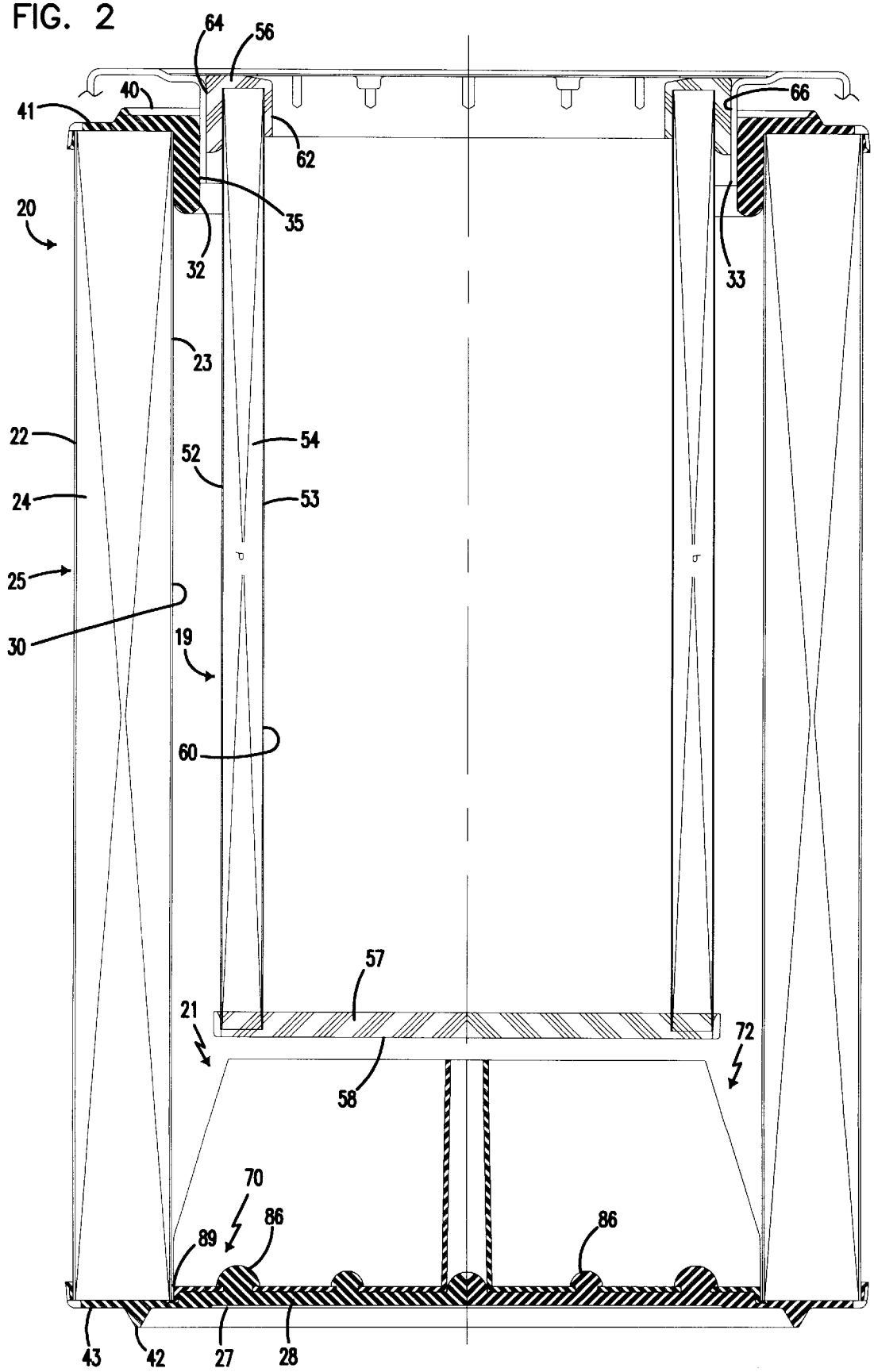
FIG. 2 is a fragmented, cross-sectional view of a primary filter element and safety element mounted on a air flow tube and including a spacer construction as shown in FIG. 1, in accordance with certain applications of the present invention.

In contrast, end cap 26 is an "open" end cap, having central aperture 32 (FIG. 2) therein. In use, filter element 20 is secured within air cleaner 10 with aperture 32 circumscribing an air flow tube 33 (FIG. 2). As a result of the use of appropriate sealing (via a variety of possible manners), for designs such as the one shown in FIG. 1, airflow is inhibited from reaching aperture 32, (and thus from being directed into outlet tube 33 for direction to an engine air intake) without filtering flow through media pack 25. For the arrangement shown, aperture 32 is defined by Donaldson radially sealing structure 34 (FIG. 1). As generally characterized in European Patent 0329659B1, the sealing structure 34 comprises soft compressible foamed polyurethane positioned as shown at region 35. Region 35, defining aperture 32, has a stepped cross-sectional configuration of decreasing diameter, to achieve desirable sealing. Preferred specifications for the profile of particular arrangement shown in FIG. 1 are as follows: a polyurethane foam material having a plurality of (preferably at least three) progressively larger steps configured to interface with the outlet tube and provide a fluid-tight seal. The larger a step, the smaller the resulting internal diameter is in the corresponding portion of the end cap, and the larger will be the compression when the element is mounted on an air flow tube. This is described in further detail with respect to FIG. 7, which shows region 35 in an uncompressed state.

Figure 7:
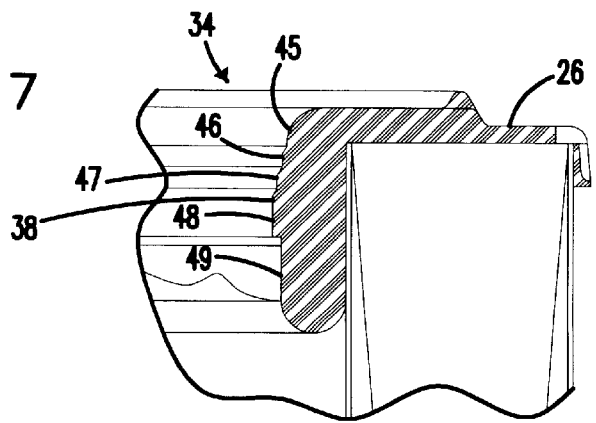
FIG. 7 is an enlarged, fragmented, cross-sectional view of a sealing arrangement used in the primary filter element depicted in FIG. 6, in accordance with certain applications of the present invention.

Attention is directed to FIG. 7. In FIG. 7, a fragmented, cross-sectional view of open end cap 26 is depicted. In particular, radial sealing surface 45 is shown, in an uncompressed state. That is, radial sealing surface 45 is shown when filter element 20 is not installed in air cleaner housing 11 and over tube 33.

Still referring to FIG. 2, radial sealing surface 45 defines a gradient of increasing internal diameters of surfaces for interfacing with air flow outlet tube 33. Specifically, in the example shown in FIG. 7, radial sealing surface 45 defines three steps 46, 47, and 48. The cross-sectional dimension or width of the steps increases, the further the step is from top portion 41 of the first end cap 26. As shown, below step 48, there is a region 49 of decreased cross-sectional width.

In general, for a properly functioning Donaldson type radially sealing structure, the material in region 35 needs to be substantially compressed when the element is mounted on outlet tube 33. In many preferred constructions, it is compressed between about 15% and 40% (often about 20–33%) of its thickness, in the thickest portion 38 (FIG. 7), to provide for a strong robust seal yet still be one that can result from hand installation of the element with forces on the order of 80 lbs or less, preferably 75 lbs or less, and generally 50–70 lbs. For the air cleaner 10 shown in FIG. 1, the compression is provided between the inner liner 23 and the outlet tube 33.

In reference to FIG. 2, the preferred filter element 20 depicted includes exterior axial projection arrangement 40 on exterior surface 41 of end cap 26. A similar companion arrangement 42 is depicted on an exterior surface 43 of end cap 27. Projection arrangements 40 and 42 help ensure a snug fit for element 20 between opposite end walls of an associated air cleaner. It is noted that as a result of the presence of the radial seal involving region 35 (FIG. 1), fluid tight seals between end walls of an associated housing, and outer surfaces 41 and 43 are not required. That is, projections 40 and 42 need not comprise seal rings (although they can be made as seal rings). The projection arrangements 40 and 42, as a result of the snug arrangement, will help to inhibit undesirable levels of bouncing movement or vibrational movement of element 1 during use, especially as the element 20 gains in weight as a result of contaminant load thereon.

2. Safety Element 19

Still referring to FIG. 1, a preferred safety element 19 is shown oriented within housing 11 and within the interior volume 30 of primary element 20. The preferred safety element 19 generally includes an outer liner 52 and an inner liner 53. A media construction 54 is positioned between the outer liner 52 and the inner liner 53. Materials utilized for outer and inner liners 52, 53 may include materials similar to those described above for primary element 20.

Figure 6:
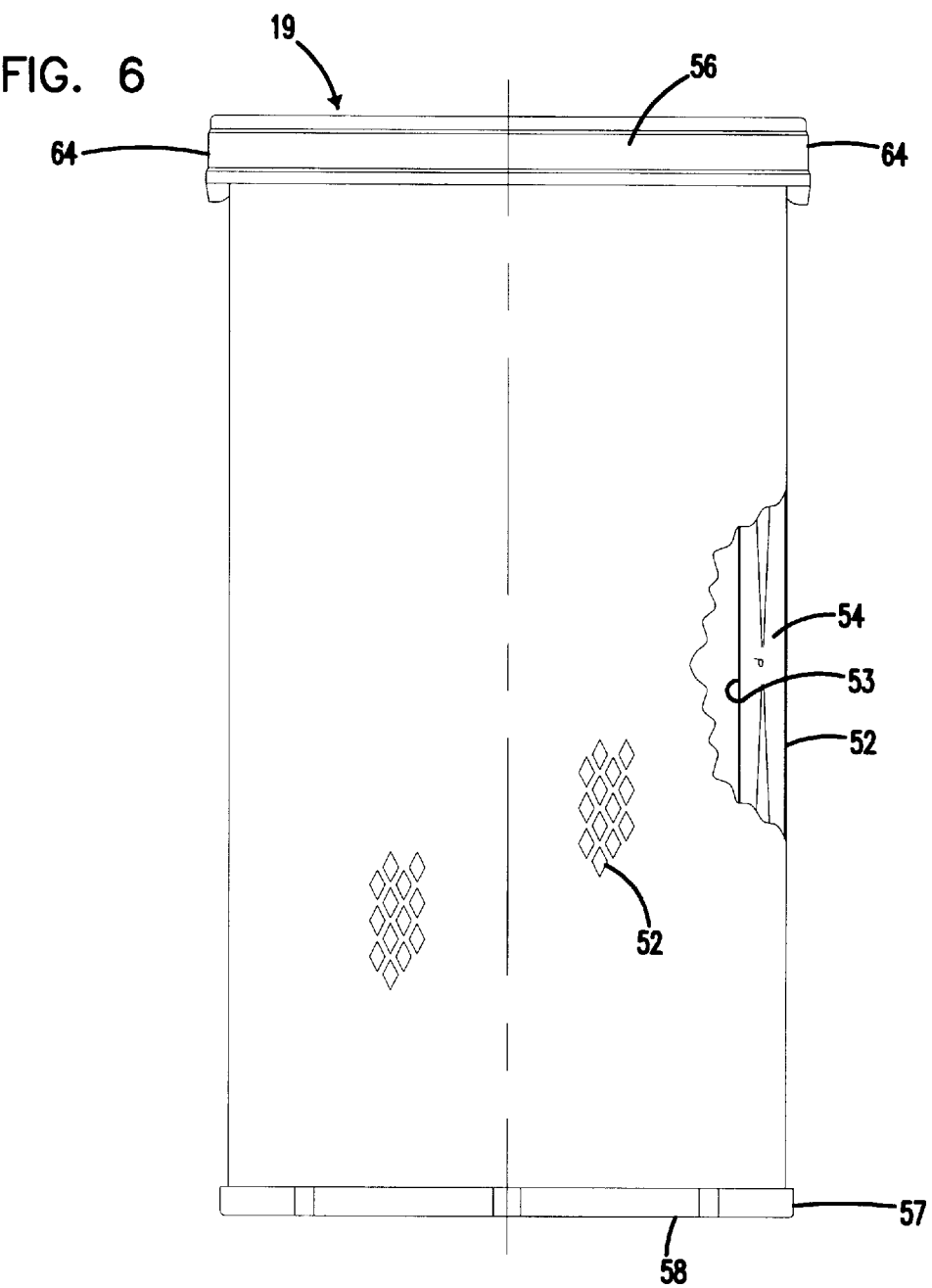
FIG. 6 is a side elevational, partially broken away, view of the safety element depicted in FIGS. 1 and 2.

The safety element 19 depicted in FIGS. 1, 2, and 6 includes first and second opposite end caps 56 and 57. In the arrangement shown, media construction 54 along with outer and inner liners 52, 53, is embedded in and extends between the end caps 56, 57. It is noted that end cap 57 is a closed end cap. That is, end cap 57 includes no air flow apertures therein, so in general, air is prevented from flowing through end 58 from an exterior of the safety element 19 to interior volume 60.

Preferably, closed end cap 57 is a hard end cap having a hardness of about 30 Shore D or harder, when tested per ASTM D2240, and an as molded density of 35–55 pounds per cubic foot. It is preferred that the closed end cap 57 be hard so that it can withstand unusually high pressure vacuums, i.e. in excess of 10 inches of mercury under pulsation (such as that caused by turbo surge). High vacuum pressure (e.g., greater than 10 inches of mercury) can cause the end cap 57 to bow inwardly. The hardness of the end cap 57 increases the rupture strength by preventing the end cap 57 from breaking or rupturing under the high vacuum pressure. More description of an example material for the closed end cap 57 is below.

In contrast, end cap 56 is a soft, open end cap, having central aperture 62. End cap 56 defines an outer radial surface 64 (FIGS. 2 and 6). In use, safety filter 19 is secured within air cleaner 10 with radial surface 64 compressed and circumscribed by air flow tube 33. Radial surface 64 of the safety element 19 is compressed against air flow outlet tube 33 to form a radial seal 66, FIG. 2 therebetween. As a result of the use of appropriate sealing, air flow is inhibited from reaching aperture 62 without filtering flow through media construction 54. Media construction 54 is only reachable after air has already flowed through media 24 of the primary element 20. It is preferred that end cap 56 be a soft, compressible material having an as molded density of about 14–22 pounds per cubic foot, in order to effect proper sealing. A description of one example materials for end cap 56 are described more fully below.

3. Spacer Construction 21

Still referring to FIG. 2, as mentioned above, primary element 20 includes insert or spacer construction 21 therein. In general, insert or spacer construction 21 is constructed and arranged to maintain the safety element 19 in air flow communication with the air flow outlet tube 33. Further, spacer construction 21 may be used to provide information to the person servicing the air cleaner 10 about whether the seat safety element 19 has been properly mounted within the air flow tube 33.

In general, spacer construction 21 may be constructed as an insert in second end cap 27, to form a composite second end cap. Insert or spacer construction 21 preferably includes an attachment arrangement 70 for securing the insert or spacer construction 21 within the open filter interior 30, and a positioning arrangement 72 extending from the attachment arrangement 70. Preferably, the positioning arrangement 72 aids in maintaining the safety element 19 in air flow communication with the air flow tube 33 by preventing it from becoming disengaged due to vibration, for example.

Figure 3:
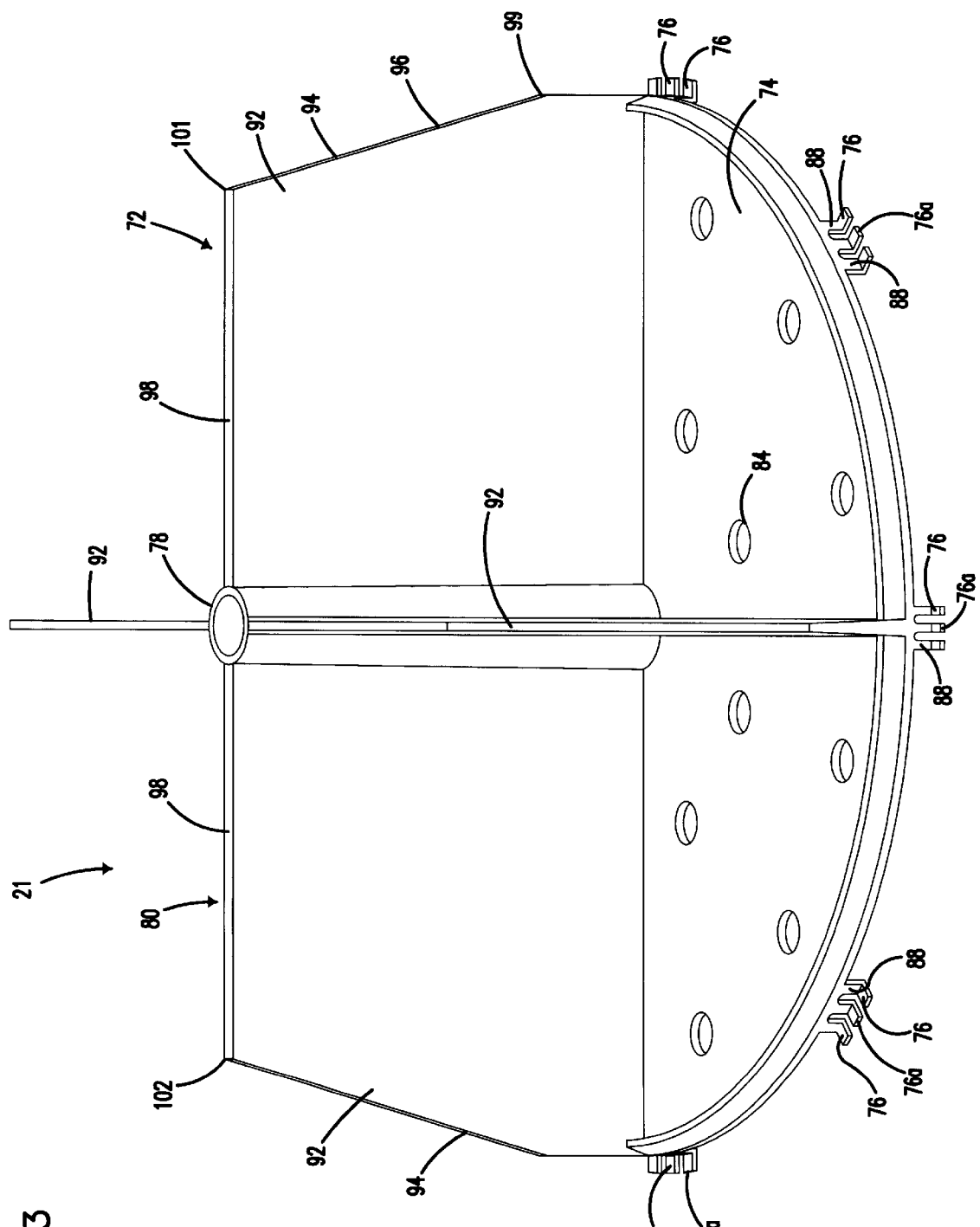
FIG. 3 is a perspective view of the spacer construction depicted in FIGS. 1 and 2, in accordance with certain applications of the present invention.

Referring now to FIG. 3, insert or spacer construction 21 is shown in perspective. As shown in FIG. 3, one preferred spacer construction 21 includes a circular plate or disk 74 with a plurality of feet 76 extending therefrom and providing structure for the attachment arrangement 70. Extending from the attachment arrangement 70 is positioning arrangement 72. In general, a central post 78 axially extending from a central part of disk 74 may operate as positioning arrangement 72. A fin structure 80 is illustrated as providing further support for post 78. In combination with the post 78, the fin structure 80 also helps to hold the safety element 19 within the outlet tube 33, if vibration causes the safety element 19 to start to move axially along the outlet tube 33.

Figure 4:
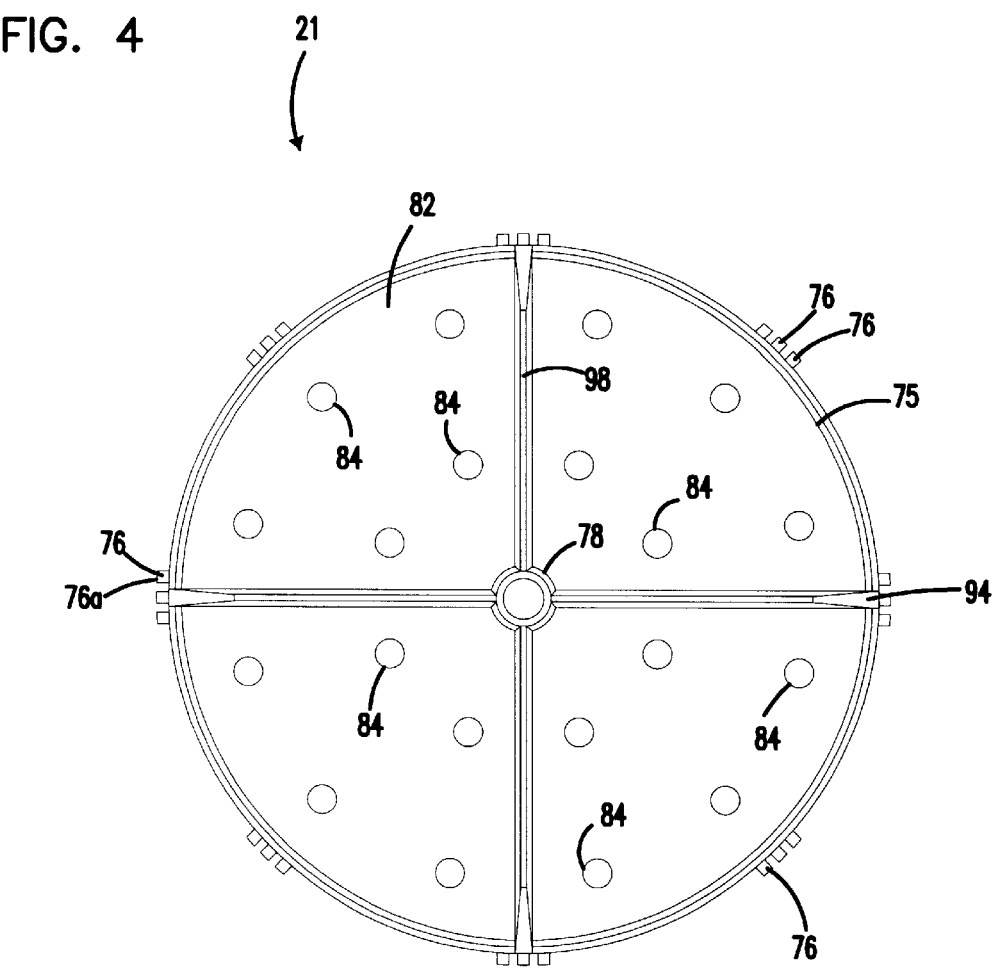
FIG. 4 is a top plan view of the spacer construction depicted in FIG. 3.

Attention is directed to FIG. 4. In FIG. 4, a top plan view of spacer construction 21 is shown. As shown in FIG. 4, disk 74 includes a circular attachment member 82 with at least one, and typically a plurality of, apertures 84 defined therein. An optional aperture pattern for attachment member 82 is shown in FIG. 4. This pattern allows for flow of polymer therethrough during cure, to facilitate attachment to the closed end cap 27. Typically, 12–25 spaced apertures 84 of 0.25–0.50 inch diameter size will be enough. In general, apertures 84 can be characterized as free rise apertures, since they allow for flow or rise of polymer through portions of spacer construction 21 during molding of end cap 27. In FIG. 2, polymer nodules 86 are depicted as risen through the apertures 84. Although, as explained below, in certain instances the ratio of the open area of the apertures 84 to the total area of the disk 74 has advantages, the overall shape and configuration of the pattern of apertures 84 is not critical to performance. The overall "look" depicted for the inside of the element 20, including the shape and pattern of polymer nodules 86, provides a distinctive and attractive appearance.

Free rise apertures 84 allow for free rise of polymeric material of the second end cap 27 therethrough, during the molding process. This helps secure the spacer construction 19 as part of composite end cap 27.

In general, it has been found that certain ratios of the total open area of the free rise apertures 84 to the total perimeter area of the disk 74 work well for providing gassing off of the polymer and for advantageous mechanical attachment. By "total area of the free rise apertures 84", it is meant the area of each of the apertures 84 added together. By "total perimeter area of the disk 74", it is meant the area of the disk 74 as though it were solid (that is, without apertures 84). This will typically be the area defined by perimeter 75. For example, in the embodiment illustrated, disk 74 is circular, so the total area is $\pi$ multiplied by the radius of the disk squared. In general, it has been found that, in certain preferred arrangements, the total area of the free rise apertures 84 will be at least 1% of the total perimeter area of the disk 74, in order to provide for acceptable gassing off of the polymer as it rises. It has also been found that, in certain preferred arrangements, the total area of the free rise apertures 84 will be no greater than 9% of the total perimeter area of the disk 74, in order to provide for acceptable mechanical attachment between the spacer construction 21 and the end cap 27. Typically, the total area of the free rise apertures 84 will be from 2–6% of the total perimeter area of the disk 74.

In one example embodiment, the total area of the free rise apertures 84 is about 3.5% of the total perimeter area of the disk 74. In other words, the total perimeter area of the disk 74 is about 28 times the total area of the apertures 84.

Referring again to FIG. 3, spacer construction 21 includes at least one foot 76, and preferably a plurality of feet 76 extending below and laterally from disk 74. Preferably, 16–32 radially spaced feet 76 are used. Feet 76 are preferably supported by legs 88. In general, feet 76 include tips 76a oriented to be positioned over the media pack 25, in use, with legs 88 depending from feet 76 to the perimeter 75 of disk 74. That is, each of the feet 76 project laterally and are oriented adjacent to and extend over the end of the inner liner 23. By "project laterally", it is meant that the feet 76 extend over or across the end of the inner liner 23 to intersect the inner liner 23, and in certain preferred embodiments, intersect the inner liner 23 substantially orthogonally thereto.

Legs 88 are preferably sized to compress against a portion 89, FIG. 2, of inner liner 23 during assembly. In general, what would be preferred is that legs 88 be configured such that, during assembly, spacer construction 21 can be pressed (or press-fit) into the end of media pack 25 with the spacer construction 21 retained thereon by interference or friction fit caused by legs 88. As a result, the assembly (media pack 25 and insert or spacer construction 21) can be lowered into a mold for application of the material of end cap 27 without inadvertent separation of the spacer construction 21 from the remainder of the media pack 25. Further, by press-fitting the insert or spacer construction 21 into the media pack 25, the media pack 25 is "rounded out". That is, the media pack 25 is made to have a circular cross-section. This helps provide an even cross-sectional thickness of the media pack 25, which is desirable for filtering operations.

In the resulting element 20, feet 76 are preferably at least partially embedded in, or positioned underneath, the end cap material. The feet 76 lock or anchor or hook the spacer construction 21 to the inner liner 23, to help resist force from pushing the media pack 25 out of the inner liner 23. In addition, feet 76 secure the spacer construction 21 to the inner liner during the free rise of the polymer of the end cap 27. The feet 76 hold the insert or spacer construction 21 to the inner liner 23 and help to prevent the free rise of the polymer from disorienting the spacer construction 21 relative to the inner liner 23. It should be appreciated that alternative constructions of feet 76 for securing the feet 76 to the inner liner 23 are contemplated herein. For example, the feet 76 may project straight into the inner liner 23. The feet 76 do not need to be at an end of the inner liner 23, but may be secured to other portions of the inner liner 23.

Figure 5:
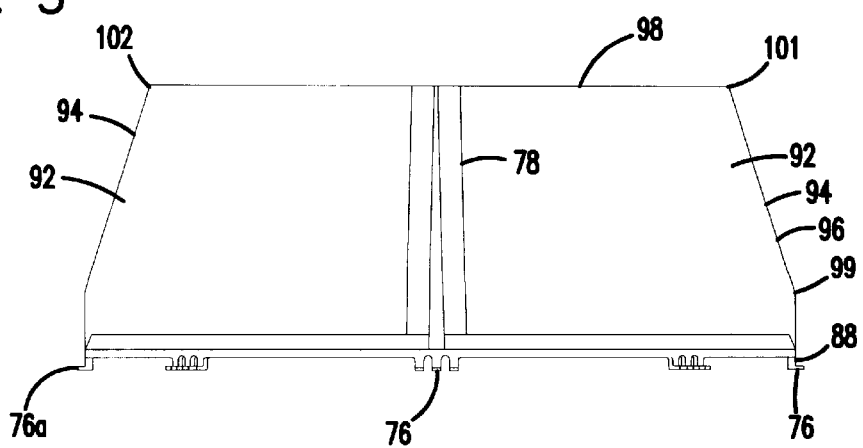
FIG. 5 is a side elevational view of the spacer construction depicted in FIGS. 3 and 4.

Referring again to FIG. 3, positioning arrangement 72 includes fin structure 80. Fin structure 80, in the embodiment illustrated, includes at least one and typically a plurality of vanes 92 axially extending from disk 74 and radially extending from post 78. There will be from 3 to 8 vanes 92, and in the embodiment depicted, there are 4 vanes 92. As can be seen in FIG. 5, each one of the preferred vanes 92 depicted is generally substantially trapezoidal in shape. That is, each of vanes 92 includes a chamfered surface 94 providing a tapering, beveled, or angled edge 96 from a top edge 98 downwardly to edge 99.

In general, the preferred fin structure 80 is designed such that it does not substantially deter normal air flow through the air cleaner 10. This is accomplished by positioning fin structure 80 in-line with the direction of air flow. Inside of primary element 20, the air is flowing toward the safety element 19. The vanes 92 are oriented to project in the same direction as the primary direction of air flow.

In alternate arrangements, the spacer construction 21 may be modified to affect airflow inside of the filter interior 30. For example, the fin structure 80 may be designed such that the vanes 92 are angled or configured in other shapes to help to direct the airflow in certain desired patterns.

When assembled in an air cleaner such as that shown at 10, the end tip or the outer most projecting surface of the post 78 is spaced from the end 58 of the closed end cap 57 of the safety element 19. Generally, in preferred systems, this gap or space between the spacer construction 21 and the safety element 19 is from about ⅛ to ⅜ of an inch, and typically will be about 0.25 inches. This gap or space exists when the safety element 19 is fully and properly mounted on the outlet tube 33, and the primary element 20 is fully and properly mounted on the outlet tube 33.

As should be appreciated from the foregoing description, spacer construction 21 may be used to provide information to a person servicing the air cleaner 10 about whether the safety element 19 has been properly mounted and seated within the airflow tube 33. If the safety element 19 is not fully or properly mounted in the airflow tube 33, as the primary element 20 is mounted on the airflow tube 33, the spacer construction 21 will engage the second end cap 57 of the safety element 19. At that point, the primary element 20 can be removed, and the safety element 19 can be properly and fully mounted on the airflow tube 33. If, however, the person servicing the air cleaner 10 decides to use the primary element 20 to fully mount the safety element 19, the spacer construction 21 provides reinforcement of the closed end cap 27, to prevent rupture. The central post 78 and top edges 98 of vanes 92 push against the second end cap 57 to axially move the safety element 19 with respect to the air flow outlet tube 33 and to seat or mount the safety element 19.

Further, it should be appreciated by the foregoing description that spacer construction 21 aids in preventing the safety element 19 from falling out or becoming disengaged from the air flow outlet tube, due to vibration, for example. As the air cleaner 10 is used on a system such as an over the highway truck or an off-road vehicle, the air cleaner 10 including the air flow outlet tube 33 may vibrate. This vibration may cause the safety element 19 to move axially relative to the air flow tube 33. Spacer construction 21 prohibits safety element 19 from becoming disengaged from air flow outlet tube 33 by providing a stop. The post 78, in combination with the fin structure 80, holds the safety element 19 in the air flow tube 33. In other words, spacer construction 21 prevents enough movement of safety element 19 to inhibit the safety element 19 from backing out or falling out of air flow tube 33.

The spacer construction 21 also helps to control the molding process. That is, spacer construction 21 partially contains the rising polymeric material of the second end cap 27, during the molding process, in part to maintain substantial portions along the inner liner 23 at portion 89 open. Without the insert or spacer construction 21, the polymer may creep up unevenly around the media 24. Insert or spacer construction 21 can help to prevent the polymeric material of the second end cap 27 from rising too much such that it blocks portions of the media 24 in the vicinity of the second end cap 27.

Another advantage of the insert or spacer construction 21 is that it reinforces the second end cap 27, to increase the rupture strength. Specifically, the spacer construction 21 provides improved rigidity to the second end cap 27 so that it can withstand unusually high pressure vacuums, i.e. in excess of 10 inches of mercury under pulsation (such as that caused by turbo surge). High vacuum pressure (e.g., greater than 10 inches of mercury) can cause the end cap 27 to bow inwardly. The reinforced end cap 27 has an increased rupture strength over end caps without inserts, because the reinforced, composite end cap 27 is prevented from breaking or rupturing under the high vacuum pressure. Further, the insert or spacer construction 21 helps to maintain the inner liner 23 round or circular under conditions of high vacuum pressure. This prevents stress on the open end cap 26, and increases the rupture strength over primary elements which lack inserts or spacer constructions.

D. Example Materials

The following section provides examples of typical, and in certain instances, preferred materials for the arrangements herein. It is understood, of course, that alternative materials may be utilized if appropriate.

Spacer construction 21 may be constructed from high impact polystyrene, having a material thickness of about 2 millimeters and molded with a draft angle of about 1°.

Housing 11 may be constructed from sheet metal, for example low carbon steel having a thickness of 0.8 mm (0.03 in.) to 3 mm (0.12 in.). Media 24 may comprise a pleated media, or alternatively, a depth media. If pleated media is used, in general, paper or cellulose fiber media or media comprising cellulose fibers and synthetic fibers can be used. The media may be treated, for example with oiling as described in U.S. Pat. No. 5,423,892, incorporated herein by reference. Or, for example, the media may be treated with expanded polytetfloroethylene (PTFE). Also, as explained in U.S. Pat. No. 5,423,892, incorporated herein by reference, the efficiency of barrier media such as paper or cellulose can be modified in some instances by applying to a surface of the media, a deposit of relatively fine fibers, typically less than 5 microns and in many instances submicron sized (average) fibers. Alternatively, if depth media is used, media as media as described in U.S. Pat. No. 5,423,892, may be used. Media 54 for safety element 19 may generally comprise a pleated media, such as paper or cellulose. The media 54 may be treated as described above, or include depth media as described in U.S. Pat. No. 5,423,892.

Open end cap 26 may be typically a soft polymeric material, such as foamed urethane. The specific material selected for the open end cap 26 does not directly relate to the operation of the insert or spacer construction 21, as long as the material chosen is appropriate for its sealing function. One example usable material includes the following polyurethane, processed to an end product having an "as molded" density of 14–22 pounds per cubic foot. The polyurethane comprises a material made with I35453R resin and I305OU isocyanate, which is sold exclusively to the assignee Donaldson by BASF Corporation, Wyandotte, Mich. 48192.

The materials should be mixed in a mix ratio of 100 parts I35453 resin to 36.2 parts I305OU isocyanate (by weight). The specific gravity of the resin is 1.04 (8.7 lbs/gallon) and for the isocyanate it is 1.20 (10 lbs/gallon). The materials are typically mixed with a high dynamic shear mixer. The component temperatures should be 70–95° F. The mold temperatures should be 115–135° F.

The resin material I35453R has the following description:
 (a) Average molecular weight
  1) Base polyether polyol=500–15,000
  2) Diols=60–10,000
  3) Triols=500–15,000
 (b) Average functionality
  1) total system=1.5–3.2
 (c) Hydroxyl number
  1) total systems=100–300
 (d) Catalysts
  1) amine=Air Products 0.1–3.0 PPH
  2) tin=Witco 0.01–0.5 PPH
 (e) Surfactants
  1) total system=0.1–2.0 PPH
 (f) Water
  1) total system=0.03–3.0 PPH
 (g) Pigments/dyes
  1) total system=1–5% carbon black
 (h) Blowing agent
  1) 0.1–6.0% HFC 134A.

The I305OU isocyanate description is as follows:
 (a) NCO content—22.4–23.4 wt %
 (b) Viscosity, cps at 25° C.=600–800
 (c) Density=1.21 g/cm$^3$ at 25° C.
 (d) Initial boiling pt.—190° C. at 5 mm Hg
 (e) Vapor pressure=0.0002 Hg at 25° C.
 (f) Appearance—colorless liquid
 (g) Flash point (Densky-Martins closed cup)=200° C.

Closed end cap 27 is preferably constructed from a compressible, soft polymeric material such as foamed polyurethane having low density, such that expansion occurs during free-rise of the polymer. While a variety of materials may be used and with respect to the principles of operation of the spacer construction 21, no particular preference is asserted as long as the material will appropriately rise through the apertures, an example material may include the following polyurethane material:

The polyurethane should be cured for 72 hours at 65–85° F. (18–9° C.) or force cured for 30 minutes at 190+/−1.8° F. (88+/−1° C.). When force curing the polyurethane, a container of water should be placed in the oven to add humidity. At least 16 hours to recover should be allowed. The compression deflection should have a 25% deflection at room temperature (70° F.) of an average 10+4/−3 lbs. per square inch (69+27/−21 kPa). After heat aging 7 days at 158+/−1.8° F., there should be +/−20% change from the original deflection values and allowing at least 16 but not more than 96 hours to recover. At cold temperatures (−40° F.), there should be 100 pounds. per square inch (689 kPa) maximum average. For the compression set, the polyurethane should meet the maximum averages of the following after heat aging 22 hours at the temperatures specified at 50% deflection: After heat aging 22 hours at 158+/−1.8° F., 10% maximum; after heat aging 22 hours at 180°+/−1.8° F., 25% maximum. The tensile strength should be 90 psi (620 kPa) minimum average. Elongation should be 100% minimum average. The polyurethane comprises a material made with 36070R resin/I-3050U isocyanante, formulated to a molded density of 10–22 lbs./sq. ft., preferably 12–15 lbs./sq. ft., which is sold exclusively to the assignee Donaldson by BASF Corporation.

Open end cap 56 of safety element 19 may also be constructed of a compressible, soft polymeric material such as foamed polyurethane, molded to an as molded density of 14–22 pounds per cubic foot, and may be formed from the same materials as open end cap 26.

Closed end cap 57 of safety element 19 is preferably constructed of hard, elastomeric polymeric material having an as molded density of 35–55 pounds per cubic foot, and durometer of 30 shore D minimum average, tested per ASTM d2240. The particular material for closed end cap 57 may comprise a variety of materials, as the materials selected for the closed end cap 57 does not directly relate to the operation of the insert or spacer construction 21, except insofar as it may be engaged by (abutted by) spacer construction 21 during use.

One usable safety element 19 is available from Caterpillar of Peoria, Ill., as Caterpillar part no. GI-2510

E. Systems and Methods of Operation

Figure 8:
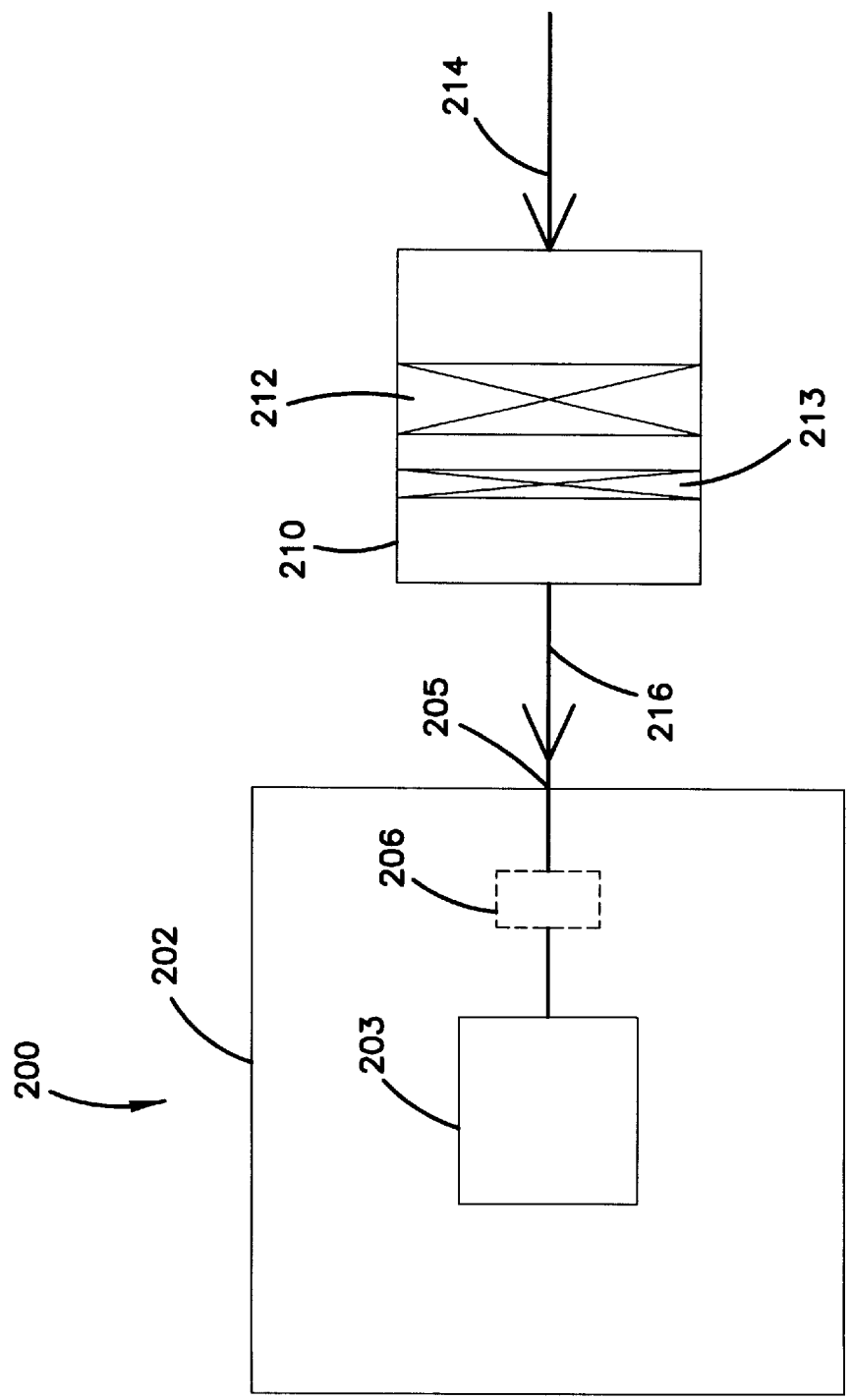
FIG. 8 is a schematic view of a system having an engine with an air intake system and an air cleaner therein, in which an arrangement according to FIG. 1 can be used.

In FIG. 8, a schematic view of a system is shown generally at 200. System 200 is one example type of system in which air cleaner arrangements and constructions described herein is usable. In FIG. 8, equipment 202, such as a vehicle, having an engine 203 with some defined rated air flow demand is shown schematically. Equipment 202 may comprise a bus, an over the highway truck, an off-road vehicle, a tractor, or marine application such as a power boat. Engine 203 powers equipment 202, through use of an air, fuel mixture. In FIG. 8, air flow is shown drawn into engine 203 at an intake region 205. An optional turbo 206 is shown in phantom, as optionally boosting the air intake into the engine 203. An air cleaner 210 having a primary element 212 and a safety element 213 is upstream of the engine 203 and turbo 206. In general, in operation, air is drawn in at arrow 214 into the air cleaner 210 and through primary element 212 and safety element 213. There, particles and contaminants are removed from the air. The cleaned air flows downstream at arrow 216 into the intake 205. From there, the air flows into engine 203, to power vehicle 202.

A method for servicing an air cleaner is as follows: Air cleaner 10 is opened to provide access to the internal elements. Specifically, cover 15 is removed from body 17. Primary filter element 20 is pulled from the outlet tube 33 to unseal the radial seal at region 35. Next, if changing the safety element 19, safety element 19 is pulled from the interior of air flow outlet tube 33, unsealing radial seal 66. Primary element 20 and safety element 19 are discarded. A second, different safety element 19 is then mounted in air flow communication with air flow tube 33. Specifically, first end cap 56 is placed inside of air flow tube 33 by sliding radial surface 64 against the inner circumferential surface of air flow tube 33 to form a radial seal 66. The safety element 19 may or may not be completely inserted on air flow outlet tube 33. Next, a second, different primary element 20 is placed over and around safety element 19, such that safety element 19 is within the open filter interior volume 30. Open end cap 26 is aligned with to circumscribe the air flow tube 33, and the radial surface 45 of the open end cap 26 is slid along the airflow tube 33 to form a radial seal at region 35. If the safety element 19 has not been fully or properly mounted in the airflow tube 33, as the primary element 20 is being mounted on the airflow tube 33, spacer construction 21 abuts and engages second end cap 57 of the safety element 19. This informs the person servicing the air cleaner 10 that the safety element 19 has not been properly mounted. The primary element 20 may then be removed, and the safety element 19 adjusted to fully and properly mount the safety element 19 on the airflow tube 33. Alternatively, if the person servicing the air cleaner 10 decides to use the primary element 20 to mount the safety element 19, the central post 78 and top edges 98 of vanes 92 push against the second end cap 57 to axially move the safety element 19 with respect to the air flow outlet tube 33 and to seat or mount the safety element 19.

In operation, as the air cleaner is used on a system such as an over the highway truck or an off-road vehicle, the air cleaner 10 including the air flow outlet tube 33 may vibrate. Without spacer construction 21, this vibration may cause the safety element 19 to axially slide out of engagement with air flow tube 33. Spacer construction 21 operates to prohibit safety element 19 from becoming dislodged from air flow outlet tube 33. For example, if safety element 19 moves axially downwardly, in the orientation shown in FIG. 1, it engages the positioning arrangement 72. The post 78 in combination with the fin structure 80 holds the safety element 19 into air flow communication, maintaining the radial seal 66, with the air flow tube 33. That is, spacer construction 21 prevents safety element 19 from backing out or falling out of air flow tube 33.

F. One Example Construction

In the following paragraphs, one specific preferred example of an air cleaner assembly is described. It is understood, of course, that alternative constructions and dimensions may be utilized.

Disk 74 would have a diameter corresponding to about the inner diameter of the inner liner 23. This may typically range between 100–275 mm, and in one example would be 238 mm. The free rise apertures 84 would preferably comprise an outer ring of apertures and an inner ring of apertures. The outer ring of apertures would be on a diameter of about 186.5–187 mm, and be 12 apertures. Each of the apertures 84 would have a diameter of between about 6.4–12.7 mm, and in one example, about 10 mm. The inner circle of apertures 84 would have a diameter of about 93–94 mm and be 8 apertures. Each of the 8 apertures 84 would have a diameter of between about 6.4–12.7 mm, and in one example about 10 mm.

The center post 78 would have a diameter of about 15–25 mm, and in one example would be about 20 mm. Therefore, the ratio between the diameter of the center post 78 and the outer diameter of the disk 74 would be about 0.08. The axial length of the center post 78 would be about 50–125 mm, and in one example would be about 91 mm. The overall length of spacer construction 21 between the outermost tip of post 78 to the bottom of feet 76 would range between about 55–130 mm, and in one example would be about 97.1 mm. Generally, the overall axial length of the spacer construction 21 is at least about 38%, no greater than about 55%, and typically between about 40–45% of the distance between the open and closed end caps.

Each of the vanes 92 would have an axial length of about 96.7 mm. The distance between opposite tips 101 and 102 of fin structure 80 would range between about 60–235 mm, and in one example would be about 194.8 mm. Chamfered surface 94 would angle from the vertical by at least 10 degrees, no greater than about 25 degrees, and in one example would be about 17 degrees. The length of edge 99 would be between about 15–30 mm, and in one example would be about 18.5 mm.

Each of legs 88 on feet 76 would have a length of about 2–5 mm, and in one example would be about 3.5 mm. Each of feet 76 extends laterally from each of legs 88 by a distance of about 2–5 mm, and in one example would be about 3 mm. The height of each of feet 76 would be about 0.9–2 mm, and in one example would be about 1 mm.

For primary element 20, the outer diameter of open end cap 26 would be between about 207–363 mm, and in one example would be about 317.6 mm. The axial distance between the exterior surface 41 of the open end cap 26 and the top edge 98 of the spacer construction 21 would be between about 120–450 mm, and in one example would be about 374.3 mm. The overall axial length of primary element between the exterior surface 41 and exterior surface 43 of the open and closed end caps 26, 27 would be between about 200–610 mm, and in one example would be about 470.4 mm. The internal diameter of the inner liner 23 would be between 100–275 mm, and in one example would be about 238 mm. The distance between top edge 98 of spacer construction 21 and exterior surface 43 of closed end cap 27 would be between about 55–130 mm, and in one example would be about 96.1 mm. The inside diameter of the radial sealing surface 45 would be between about 100–300 mm, and in one example would be about 208.4 mm.

Safety element 19 would have an overall axial length between exterior portions of the first and second end caps 56, 57 of about 150–500 mm, and in one example would be about 385.6 mm. The second end cap 57 would have an outer diameter of between about 100–250 mm, and in one example would be about 200.4 mm. The first, open end cap 56 would have any outside diameter of between about 110–259 mm, and in one example would be about 211.2 mm. The open end cap 56 would have an inside diameter of between about 60–200 mm, and in one example would be about 155.5 mm.

In certain preferred arrangements, the safety element 19 will extend at least about 43% of the axial length of the primary element 20; no greater than about 85% of the axial length of the primary element; and typically will extend about 50–60% of the axial length of the primary element.

The above specification, examples and data provide a complete description of the manufacture and use of the invention. Many embodiments of the invention can be made without departing from the spirit and scope of the invention.

We claim:

1. An air filter element comprising:
   (a) an inner liner having an end and defining an inner volume;
   (b) a spacer arrangement having attachment structure and positioning structure;
      (i) said attachment structure including a disk having at least one laterally projecting foot oriented adjacent to and extending over said inner liner end;
         (A) said disk defining a plurality of free-rise apertures;
   (c) an end cap comprising a polymeric material; said end cap having said inner liner end and said attachment structure foot embedded therein;
      (i) a portion of said end cap polymeric material projecting through said free-rise apertures.

2. An air filter element according to claim 1 wherein:
   (a) said attachment structure includes at least one leg extending from said at least one foot; said leg being adjacent to said inner liner.

3. An air filter element according to claim 1 wherein:
   (a) said attachment structure disk includes an outer periphery with a plurality of spaced legs extending outwardly therefrom; each of said legs being adjacent to said inner liner.

4. An air filter element according to claim 3 wherein:
   (a) each one of said spaced legs has a radially directed foot thereon; each radially directed foot extending over said inner liner end.

5. An air filter element according to claim 4 wherein:
   (b) said end cap comprises a compressible polymeric material.

6. An air filter element according to claim 1 wherein:
   (a) an area of said free rise apertures is at least 1% of a total area of said disk.

7. An air filter element according to claim 6 wherein:
   (a) the area of said free rise apertures is no greater than 9% of the total area of said disk.

8. An air filter element according to claim 7 wherein:
   (a) said positioning structure includes a central post and fin members radially extending from said disk.

9. An air filter element according to claim 8 further including:
   (a) cylindrical media construction having first and second opposite ends and defining an open filter interior;
      (i) said central post and fin members extending inside of said open filter interior.

10. An air filter element according to claim 9 wherein:
    (a) said end cap is closed, with said media construction embedded therein at said second end of said media construction; and
    (b) the air filter element further includes an open polymeric end cap, with said media construction embedded therein at said first end of said media construction.

11. An air filter element according to claim 10 further including:
    (a) an outer liner circumscribing said media construction.

12. An air filter element according to claim 11 wherein:
    (a) said media construction comprises pleated media.

13. In an air cleaner having a housing with an airflow outlet tube and a safety element mounted on the outlet tube; the improvement comprising:
    (a) a primary cylindrical element oriented within said housing and mounted on said outlet tube and over said safety element; said primary element having a polymeric end cap and an inner liner embedded therein; and
    (b) a spacer construction having a disk and a plurality of feet; said disk having a plurality of apertures therein;
       (i) said plurality of feet securing said spacer construction to said inner liner and
       (ii) said end cap having portions projecting through said apertures.

14. The improvement according to claim 13 wherein:
    (a) said spacer construction is oriented between said primary element end cap and said safety element.

15. The improvement according to claim 14 wherein:
    (a) said primary element end cap comprises a compressible polymeric material.

16. The improvement according to claim 15 wherein:
    (a) said disk has an outer periphery with a plurality of spaced legs; each of said spaced legs having one of said feet extending outwardly therefrom;
       (i) each of said feet extending over an end of said inner liner.

17. The improvement according to claim 16 wherein:
    (a) said primary element includes:
       (i) a cylindrical media construction embedded within said end cap; said end cap being a closed end cap;
       (ii) said primary element includes an open end cap with said cylindrical media construction being embedded therein; and
       (iii) an outer liner supporting said media construction and extending between and being embedded within said open end cap and said closed end cap; and
    (b) said spacer construction includes a post and fin arrangement extending from said disk.

* * * * *